United States Patent
Kubota

(10) Patent No.: US 9,722,898 B2
(45) Date of Patent: Aug. 1, 2017

(54) QUALITY ESTIMATION METHODS, QUALITY ESTIMATION APPARATUS, AND RECORDING MEDIUM

(71) Applicant: FUJITSU LIMITED, Kawasaki-shi, Kanagawa (JP)

(72) Inventor: Atsushi Kubota, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 63 days.

(21) Appl. No.: 14/837,413

(22) Filed: Aug. 27, 2015

(65) Prior Publication Data

US 2016/0112289 A1    Apr. 21, 2016

(30) Foreign Application Priority Data

Oct. 21, 2014  (JP) .................. 2014-214381

(51) Int. Cl.
   *H04L 12/26*    (2006.01)
   *H04L 12/24*    (2006.01)
   *G06F 9/50*     (2006.01)

(52) U.S. Cl.
   CPC .......... *H04L 43/0841* (2013.01); *G06F 9/505* (2013.01); *H04L 41/142* (2013.01); *H04L 43/0864* (2013.01)

(58) Field of Classification Search
   CPC ............... H04L 43/0841; H04L 41/142; H04L 43/0864; G06F 9/505
   See application file for complete search history.

(56) References Cited

U.S. PATENT DOCUMENTS

| | | | |
|---|---|---|---|
| 2005/0289395 A1 | 12/2005 | Katsuyama et al. | |
| 2006/0031466 A1* | 2/2006 | Kovach | H04L 43/0864 709/224 |
| 2008/0039128 A1* | 2/2008 | Ostman | H04W 52/54 455/522 |
| 2012/0102402 A1* | 4/2012 | Kwong | G06F 3/038 715/705 |
| 2014/0146722 A1* | 5/2014 | Azizi | H04L 69/22 370/311 |

FOREIGN PATENT DOCUMENTS

JP    2006-13920    1/2006

* cited by examiner

*Primary Examiner* — Omar Ghowrwal
(74) *Attorney, Agent, or Firm* — Staas & Halsey LLP

(57) ABSTRACT

An quality estimation method executed by a processor included in a quality estimation apparatus, the method includes obtaining a plurality of packets communicated between a client device at a first point and a server device; extracting a number of losses indicating the number of lost packets among the plurality of packets by analyzing the plurality of packets; determining statistics information of a delay time due to packet loss of the plurality of packets, based on the number of losses and quality information indicating quality of a network used for communication between a client device at a second point and the server device; and estimating a response time of the server device on operation performed by the client device at the second point based on the determined statistics information.

19 Claims, 20 Drawing Sheets

FIG. 4

| | TIME INFORMATION | CLIENT INFORMATION | SERVER INFORMATION | TYPE INFORMATION | COMMAND NAME | COMMAND PARAMETER | THE NUMBER OF PACKETS | RTT |
|---|---|---|---|---|---|---|---|---|
| | 211 | 212 | 213 | 214 | 215 | 216 | 217 | 218 |
| | ···OMISSION OF THE BEGINNING··· | | | | | | | |
| | 2014/03/18 10:58:35.515464 | 10.25.245.211 | 10.39.2.23 | Response | send desk picture | [codec=5;CAD, id=0, x=288, y=1024, w=48, h=16] | [packetNum=1] | [rtt=0.000065] |
| | 2014/03/18 10:58:35.515600 | 10.25.245.211 | 10.39.2.23 | Response | send desk picture | [codec=5;CAD, id=0, x=352, y=1024, w=48, h=16] | [packetNum=1] | [rtt=0.000065] |
| | 2014/03/18 10:58:35.515655 | 10.25.245.211 | 10.39.2.23 | Response | send desk flush image | [cFlag=0x00, time=69426388, ncFrm=6] | [packetNum=1] | [rtt=0.000065] |
| (1)→ | 2014/03/18 10:58:35.518134 | 10.25.245.211 | 10.39.2.23 | Request | keybd down | [key=UP] | [packetNum=1] | [rtt=0.000065] |
| (2-1)→ | 2014/03/18 10:58:35.570621 | 10.25.245.211 | 10.39.2.23 | Response | copy rect cmd | [x1=2, y1=71, x2=2, y2=255, x3=1696, y3=990] | [packetNum=1] | [rtt=0.000065] |
| | 2014/03/18 10:58:35.609020 | 10.25.245.211 | 10.39.2.23 | Request | keybd up | [key=UP] | [packetNum=1] | [rtt=0.000065] |
| | 2014/03/18 10:58:35.683401 | 10.25.245.211 | 10.39.2.23 | Request | keybd down | [key=UP] | [packetNum=1] | [rtt=0.000065] |
| (2-2)→ | 2014/03/18 10:58:35.580621 | 10.25.245.211 | 10.39.2.23 | Response | send desk picture | [codec=5;CAD, id=0, x=2, y=71, w=1695, h=184] | [packetNum=39] | [rtt=0.000065] |
| (2-3)→ | 2014/03/18 10:58:35.693229 | 10.25.245.211 | 10.39.2.23 | Response | send desk flush image | [cFlag=0x100, time=69426443, ncFrm=0] | [packetNum=2] | [rtt=0.000065] |
| | 2014/03/18 10:58:35.693233 | 10.25.245.211 | 10.39.2.23 | Response | send desk picture | [codec=5;CAD, id=0, x=352, y=1024, w=48, h=16] | [packetNum=1] | [rtt=0.000065] |
| (2-4)→ | 2014/03/18 10:58:35.693234 | 10.25.245.211 | 10.39.2.23 | Response | send desk picture | [codec=5;CAD, id=0, x=464, y=1024, w=32, h=16] | [packetNum=2] | [rtt=0.000065] |
| (2-5)→ | 2014/03/18 10:58:35.694427 | 10.25.245.211 | 10.39.2.23 | Response | send desk picture | [codec=5;CAD, id=0, x=1808, y=256, w=32, h=32] | [packetNum=1] | [rtt=0.000065] |
| | 2014/03/18 10:58:35.694427 | 10.25.245.211 | 10.39.2.23 | Response | send desk flush image | [cFlag=0x100, time=69426501, ncFrm=0] | [packetNum=1] | [rtt=0.000065] |
| | 2014/03/18 10:58:35.722720 | 10.25.245.211 | 10.39.2.23 | Response | send desk picture | [codec=6;JPEG, id=0, x=1696, y=432, w=32, h=32] | [packetNum=1] | [rtt=0.000065] |
| | 2014/03/18 10:58:35.722792 | 10.25.245.211 | 10.39.2.23 | Response | send desk flush image | [cFlag=0x100, time=69426595, ncFrm=1] | [packetNum=1] | [rtt=0.000065] |
| | 2014/03/18 10:58:35.772225 | 10.25.245.211 | 10.39.2.23 | Request | keybd up | [key=UP] | [packetNum=1] | |
| | ···OMISSION OF THE REST··· | | | | | | | |

FIG. 5

| 221 | 222 | 223 | 224 | 225 | 226 | 227 | 228 | 229 | 230 |
|---|---|---|---|---|---|---|---|---|---|
| CLIENT INFORMATION | SERVER INFORMATION | OPERATION TIME INFORMATION | DRAWING BEGINNING DATA TIME INFORMATION | DRAWING FINAL DATA TIME INFORMATION | RESPONSE TIME INFORMATION | RTT | PROCESSING TIME INFORMATION | RETRANSMISSION TIME INFORMATION | TRANSFER TIME INFORMATION |
| ...OMISSION OF THE BEGINNING... | | | | | | | | | |
| 10.25.245.211 | 10.39.2.23 | 2014/03/18 10:58:35.518134 | 2014/03/18 10:58:35.570621 | 2014/03/18 10:58:35.693233 | 0.175099 | 0.000065 | 0.052422 | 0.000000 | 0.122612 |
| 10.25.245.211 | 10.39.2.23 | 2014/03/18 10:58:35.683401 | 2014/03/18 10:58:35.772634 | 2014/03/18 10:58:36.002246 | 0.318845 | 0.000065 | 0.089168 | 0.000000 | 0.229612 |
| ...OMISSION OF THE REST... | | | | | | | | | |

(arrow (3) points to the first data row)

| ITEM | VALUE |
|---|---|
| BAND | 10Mbps |
| RTT | 10 MILLISECONDS |
| PACKET LOSS RATE | 3% |

FIG. 7

| 241 | 242 | 243 | 244 | 245 | 246 | 247 | 248 | 249 | 250 |
|---|---|---|---|---|---|---|---|---|---|
| CLIENT INFORMATION | SERVER INFORMATION | OPERATION TIME INFORMATION | DRAWING BEGINNING DATA TIME INFORMATION | DRAWING FINAL DATA TIME INFORMATION | RESPONSE TIME INFORMATION | RTT | PROCESSING TIME INFORMATION | RETRANSMISSION TIME INFORMATION | TRANSFER TIME INFORMATION |
| | | | ...OMISSION OF THE BEGINNING... | | | | | | |
| 10.25.245.211 | 10.39.2.23 | 2014/03/18 10:58:35.518134 | 2014/03/18 10:58:35.570621 | 2014/03/18 10:58:35.693233 | 0.340431 | 0.000065 | 0.052422 | 0.165332 | 0.122612 |
| | | | ...OMISSION OF THE REST... | | | | | | |

24

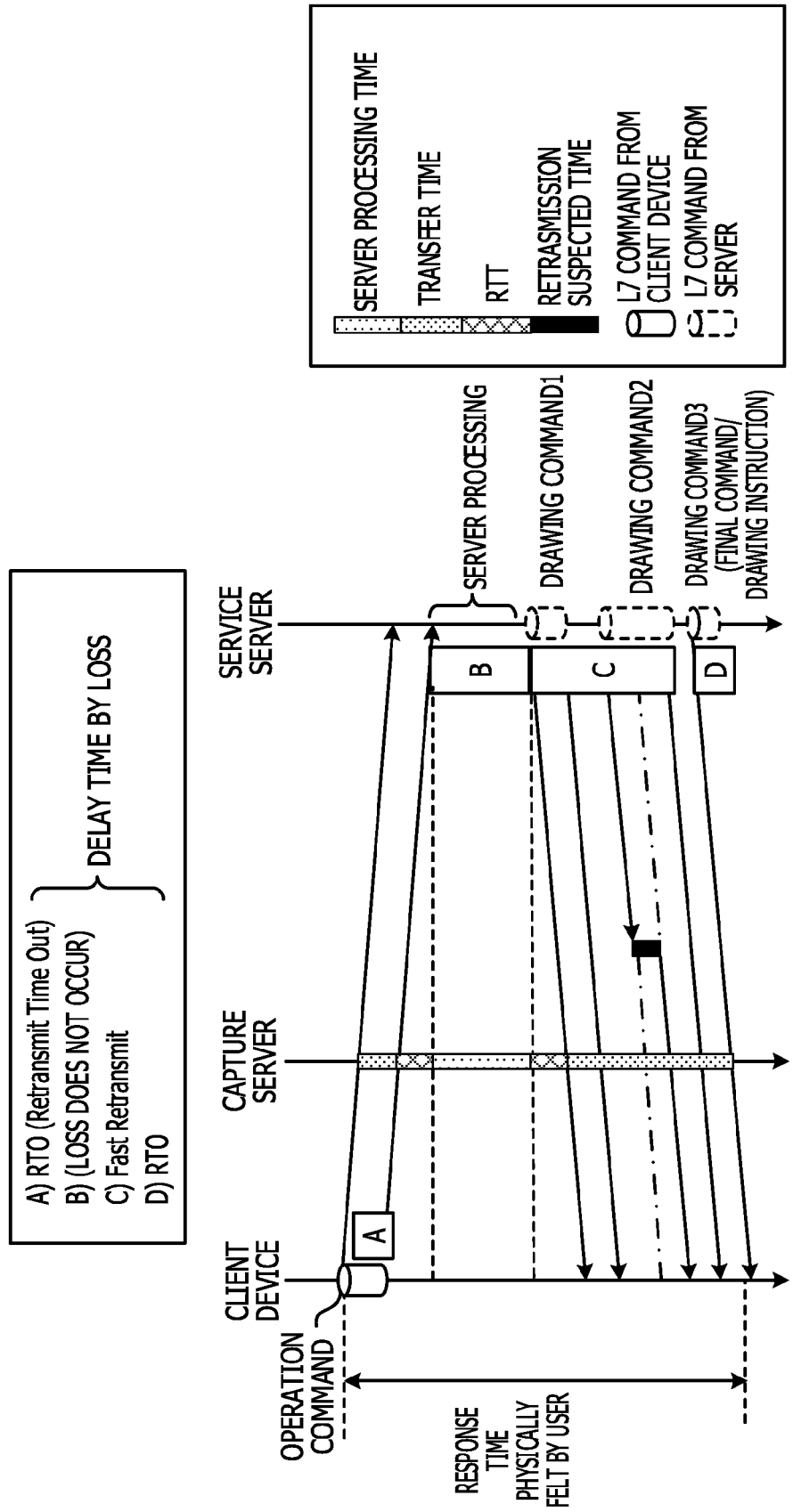

FIG. 16A

| | 221 | 222 | 223 | 224 | 225 | 226 | 227 | 228 | 229 | 230 |
|---|---|---|---|---|---|---|---|---|---|---|
| | CLIENT INFORMATION | SERVER INFORMATION | OPERATION TIME INFORMATION | DRAWING BEGINNING DATA TIME INFORMATION | DRAWING FINAL DATA TIME INFORMATION | RESPONSE TIME INFORMATION | RTT | PROCESSING TIME INFORMATION | RETRANSMISSION TIME INFORMATION | TRANSFER TIME INFORMATION |
| | ...OMISSION OF THE BEGINNING... | | | | | | | | | |
| | 10.25.245.211 | 10.39.2.23 | 2014/03/18 10:58:35.518134 | 2014/03/18 10:58:35.570621 | 2014/03/18 10:58:35.693233 | 0.175165 | 0.000065 | 0.052422 | 0.000000 | 0.122612 |
| | ...OMISSION OF THE REST... | | | | | | | | | |

FIG. 16B

| | 241 | 242 | 243 | 244 | 245 | 246 | 247 | 248 | 249 | 250 |
|---|---|---|---|---|---|---|---|---|---|---|
| | CLIENT INFORMATION | SERVER INFORMATION | OPERATION TIME INFORMATION | DRAWING BEGINNING DATA TIME INFORMATION | DRAWING FINAL DATA TIME INFORMATION | RESPONSE TIME INFORMATION | RTT | PROCESSING TIME INFORMATION | RETRANSMISSION TIME INFORMATION | TRANSFER TIME INFORMATION |
| | ...OMISSION OF THE BEGINNING... | | | | | | | | | |
| | 10.25.245.211 | 10.39.2.23 | 2014/03/18 10:58:35.518134 | 2014/03/18 10:58:35.570621 | 2014/03/18 10:58:35.693233 | 0.340431 | 0.000065 | 0.052422 | 0.165332 | 0.122612 |
| | ...OMISSION OF THE REST... | | | | | | | | | |

FIG. 16C

| CLIENT INFORMATION | SERVER INFORMATION | OPERATION TIME INFORMATION | DRAWING BEGINNING DATA TIME INFORMATION | DRAWING FINAL DATA TIME INFORMATION | RESPONSE TIME INFORMATION | RTT | PROCESSING TIME INFORMATION | RETRANSMISSION TIME INFORMATION | TRANSFER TIME INFORMATION |
|---|---|---|---|---|---|---|---|---|---|
| 241 | 242 | 243 | 244 | 245 | 246 | 247 | 248 | 249 | 250 |
| ···OMISSION OF THE BEGINNING··· | | | | | | | | | |
| 10.25.245.211 | 10.39.2.23 | 2014/03/18 10:58:35.518134 | 2014/03/18 10:58:35.570621 | 2014/03/18 10:58:35.693233 | 0.175165 | 0.000065 | 0.052422 | 0.000066 | 0.122612 |
| ···OMISSION OF THE REST··· | | | | | | | | | |

FIG. 16D

| DELAY TYPE | MAXIMUM/MINIMUM | DELAY TIME [SECOND] |
|---|---|---|
| DELAY TIME (DELAY TIME a) BY PACKET LOSS WITH OPERATION COMMAND | MAXIMUM | 0.165332 SECOND |
| DELAY TIME (DELAY TIME b) BY PACKET LOSS WITH FLUSH COMMAND | MINIMUM | 0.000066 |
| DELAY TIME (DELAY TIME c) BY PACKET LOSS WITH IMAGE DATA | | 0.000130 |

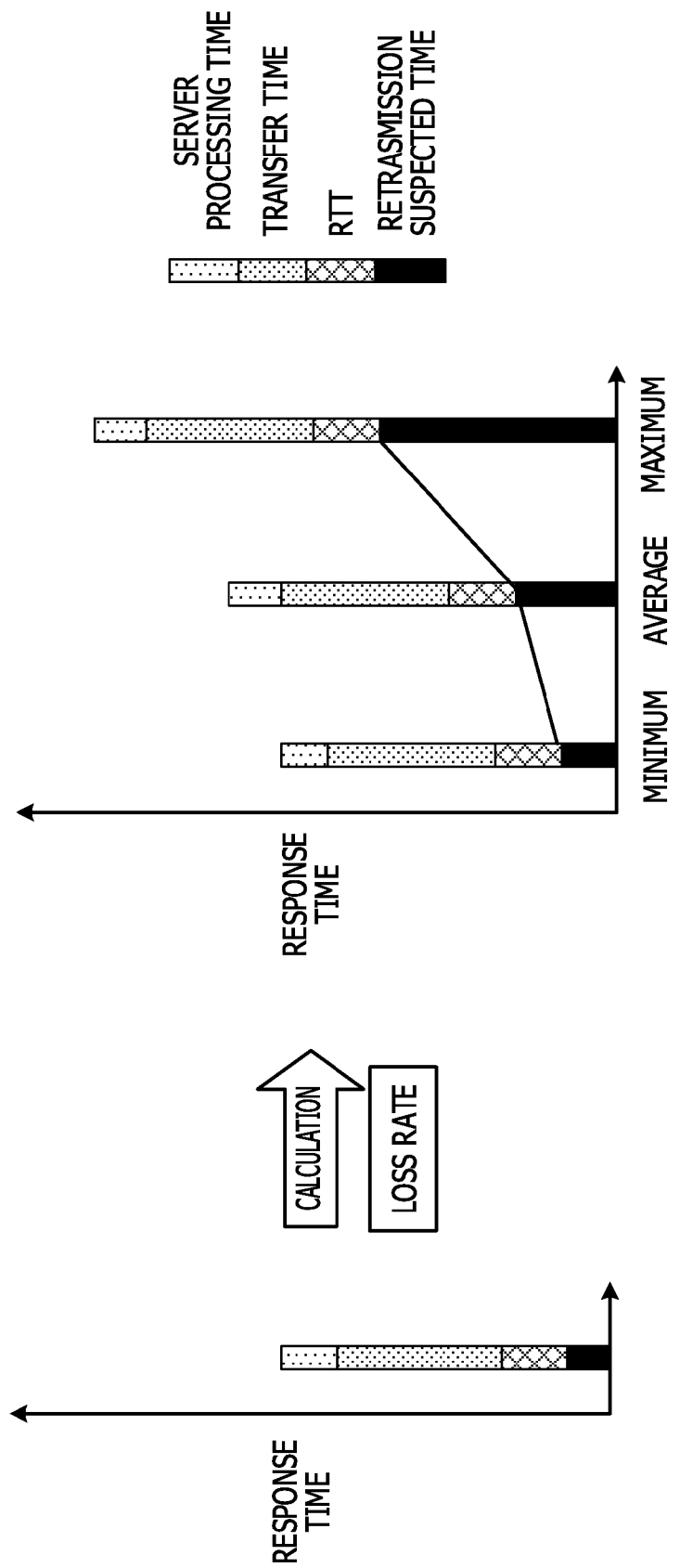

QUALITY ESTIMATION METHODS, QUALITY ESTIMATION APPARATUS, AND RECORDING MEDIUM

CROSS-REFERENCE TO RELATED APPLICATION

This application is based upon and claims the benefit of priority of the prior Japanese Patent Application No. 2014-214381, filed on Oct. 21, 2014, the entire contents of which are incorporated herein by reference.

FIELD

The embodiments discussed herein are related to a quality estimation method, a quality estimation apparatus, and a recording medium.

BACKGROUND

Techniques for obtaining packets transmitted and received between a client device and a server device in a remote desktop environment, and analyzing the state of a network are known (for example, refer to Japanese Laid-open Patent Publication No. 2006-13920).

A round-trip time (RU) is known as quality information of a network. The RU is one of the factors indicating a network delay. The RU is the sum total of a time period from when the client device transmits one packet included in an operation command, for example to when the server device receives the packet of the operation command, and a time period from when the server device transmits one packet included in a drawing command, for example, as a response of the operation command to when the client device receives the packet of the drawing command.

A user physically feels quality of a network by a time period from when the user has actually performed operation, such as moving a mouse, or the like to when image data received from the server device is displayed after drawing processing. Accordingly, a case arises when there is a difference between quality evaluation of a network, and physical feeling quality felt by a user if an RU is only used for quality evaluation of a network.

When a user uses a remote desktop environment provided by a data center, there are cases where the difference arises in physical feeling quality toward a request from the user at a first point, which is located near the data center, and a request from the user at a second point, which is located overseas, or the like, for example. It is assumed that the difference is caused by various factors, such as a distance from the data center to the first point or the second point, a network band, and the like. Accordingly, if an attempt is made to use a remote desktop environment at a new observation point, there is a problem in that it is difficult to obtain physical feeling quality unless a user actually uses the remote desktop environment at the observation point.

As a result, there are cases where even if a user is satisfied with a remote desktop environment at the first point, the user is annoyed by a slow response time in the remote desktop environment at a new observation point, and the user finds it difficult and unsatisfied to use the environment, and the like. As described above, it is desirable to make it possible to estimate a response time in the case of using network quality information at another environment based on a response time observed at an environment actually used.

SUMMARY

According to an aspect of the invention, an quality estimation method executed by a processor included in a quality estimation apparatus, the method includes obtaining a plurality of packets communicated between a client device at a first point and a server device; extracting a number of losses indicating the number of lost packets among the plurality of packets by analyzing the plurality of packets; determining statistics information of a delay time due to packet loss of the plurality of packets, based on the number of losses and quality information indicating quality of a network used for communication between a client device at a second point and the server device; and estimating a response time of the server device on operation performed by the client device at the second point based on the determined statistics information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of operation log information stored in an operation log table;

FIG. 5 is a diagram illustrating an example of information stored in a response time table;

FIG. 6 is a diagram illustrating an example of information stored in a network quality information table;

FIG. 7 is a diagram illustrating an example of information stored in an estimated response time table;

FIG. 10 is a diagram illustrating a delay time by packet loss in each unit in communication;

FIG. 16A, FIG. 16B, FIG. 16C, and FIG. 16D are diagrams illustrating information of individual tables to be used for calculation of a delay time in accordance with a packet loss rate;

FIG. 17 is a diagram illustrating an output example of an estimated response time.

DESCRIPTION OF EMBODIMENTS

In the following, descriptions will be given of embodiments of the present disclosure with reference to the attached drawings. In this specification and the drawings, a same symbol is given to a component having a substantially same functional configuration, and duplicated descriptions will be omitted.

Figure 1:
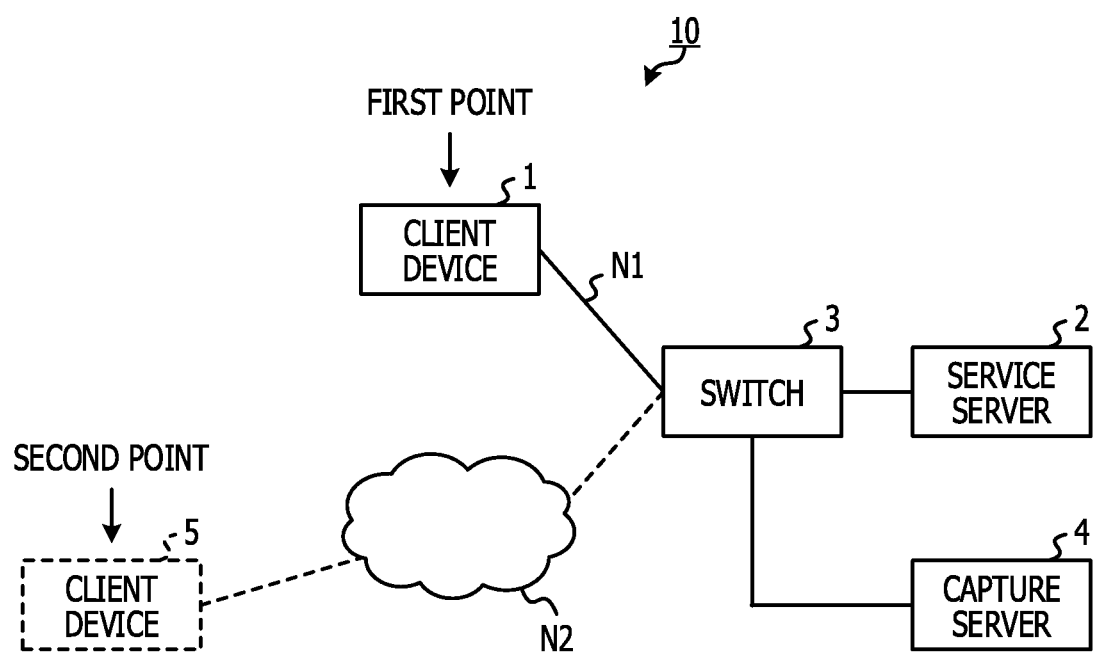
FIG. 1 is a diagram illustrating an example of a configuration of a remote desktop system.
Figure 2:
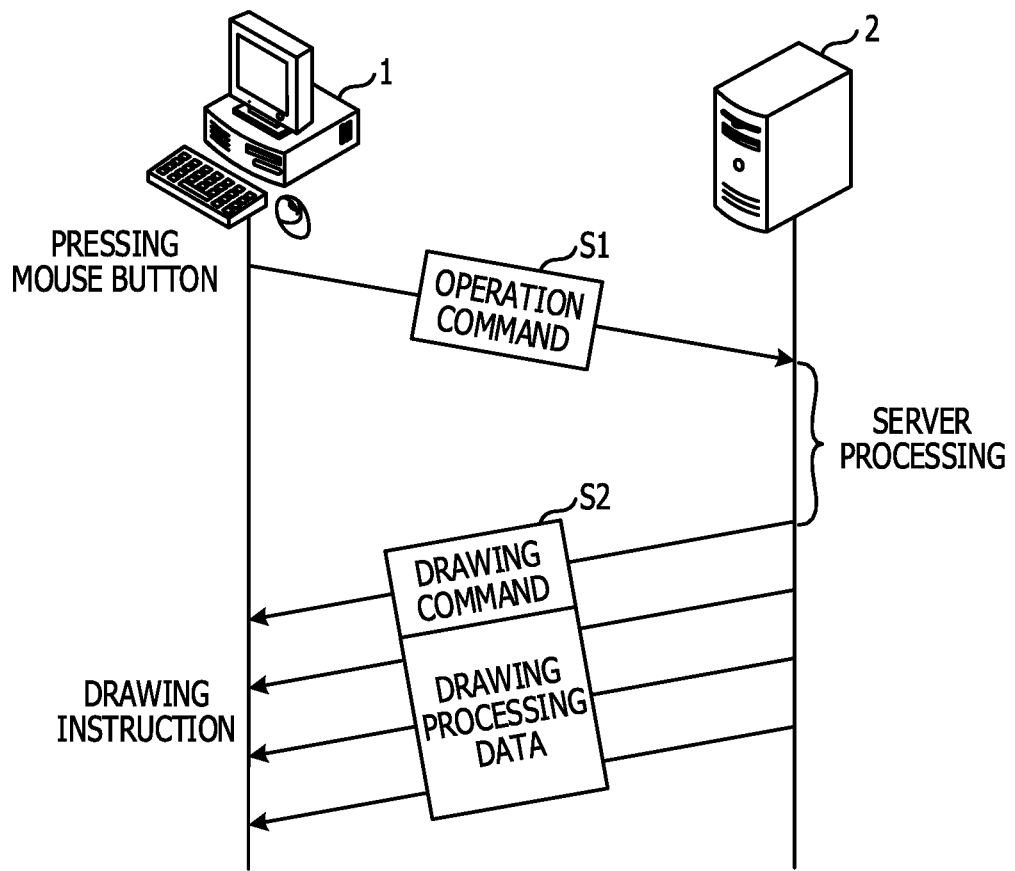
FIG. 2 is a diagram illustrating an example of operation of the remote desktop system.

First, a description will be given of a remote desktop system according to an embodiment of the present disclosure with reference to FIG. 1 and FIG. 2. FIG. 1 is a diagram illustrating an example of a configuration of the remote desktop system. FIG. 2 is a diagram illustrating an example of operation of the remote desktop system.

A remote desktop system 10 according to the present embodiment includes a client device 1, a service server 2, a switch 3, and a capture server 4. The client device 1 and the service server 2 are mutually connected through a network N1. The capture server 4 is an apparatus capable of obtaining data transmitted and received between the client device 1 and the service server 2 through the switch 3.

For example, the remote desktop system 10 includes a system called a thin client system, in which the service server 2 executes generation of a desktop screen, and provides the client device 1 with the desktop screen.

In the remote desktop system according to the present embodiment, the service server 2 and the capture server 4 are used as a single apparatus, respectively, but may be used in a plurality of apparatuses, respectively. In the case of having a plurality of service servers 2 and capture servers 4, it is possible to perform distributed processing, respectively.

In the case of using a remote desktop environment provided by a data center, the difference arises in the response time to a request, and the physical feeling quality felt by a user between the client device 1 located at a first point near the data center, and a client device 5 located at a second point far from the data center. It is assumed that the difference is caused by various factors, such as a distance from the data center to each observation point, a network band, and the like. Accordingly, if an attempt is made to use the remote desktop environment at the second point, it is difficult for the user to obtain the physical feeling quality unless the user actually uses the remote desktop environment at the second point in the present state. Thus, in the present embodiment, the present inventors propose a method (quality estimation method) of estimating a response time in the case of using the network quality information at the second point based on a response time observed at the first point where the remote desktop environment is actually used.

The capture server 4 according to the present embodiment is an example of a quality estimation apparatus that performs the quality estimation method. The quality estimation apparatus that performs the quality estimation method may be another server capable of obtaining data from the capture server 4. The quality estimation method according to the present embodiment may be achieved by the quality estimation apparatus executing a quality estimation program stored in a predetermined storage area.

As illustrated in FIG. 2, the client device 1 and the service server 2 repeat a series of processing as follows. First, the client device 1 transmits an operation command with respect to operation (hereinafter also referred to as a "user operation") of an input device by the user using a mouse, or the like to the service server 2 (S1). For example, the "user operation" includes pressing of a mouse button, moving a mouse button, key input, or the like.

The service server 2 performs drawing processing on the received operation command. The service server 2 sends back a drawing command to the client device 1 (S2). The drawing command includes image data generated by drawing processing performed by the service server 2. An example of the drawing processing performed by the service server 2 includes various kinds of drawing processing performed by a computer in accordance with input operation, for example, display of characters according to key input, movement of a pointer caused by mouse move operation, screen scroll, and the like.

The client device 1 updates the screen of the display based on the drawing command received from the service server 2. Thereby, it is possible for the user to visually recognize a result of the user operation from the display of the screen.

In the remote desktop environment, the shorter a time period from when the client device 1 transmitted the "operation command" to when the client device 1 receives the "drawing command", the better the physical feeling quality the user feels. The present system 10 is provided with the switch 3 and the capture server 4 in order to obtain an operation command and a drawing command transmitted and received between the client device 1 and the service server 2 in time series.

The switch 3 is provided with a port mirroring function together with a normal switching function. The switch 3 performs port mirroring of an operation command transmitted from the client device 1 to the service server 2, and a drawing command sent back from the service server 2 to the client device 1 toward the capture server 4.

The capture server 4 captures and obtains the operation command and the drawing command that are subjected to port mirroring by the switch 3. And the capture server 4 calculates a response time using the obtained operation command and drawing command from when the client device 1 transmitted an input operation to when the drawing command generated in accordance with the input operation is sent back to the client device 1. The calculated response time corresponds to the physical feeling quality felt by a user who uses the client device 1 at the first point. That is to say, in the remote desktop environment, the shorter a time period from when the client device 1 transmitted the "operation command" to when the "drawing command (image data)" is received, the better the physical feeling quality felt by the user.

Here, when the user uses a service in the remote desktop environment provided by a domestic data center at a domestic first point, it is possible for the user to use sufficiently high-quality line. Accordingly, it is thought that the physical feeling quality of the user is good. However, when the same service is provided to a user at a second point abroad, it is thought that the network line quality (hereinafter also referred to as "network quality") used by the user at the second point becomes worse compared with the line used by a domestic user who receives the service at the first point. Accordingly, if an attempt is made to use the remote desktop environment at a new second point different from the first point located near the domestic data center, there is a problem in that it is difficult to obtain the physical feeling quality unless the user actually uses the remote desktop environment at the second point.

Thus, in comparison with a response time from the user operation to the drawing at a certain observation point, the capture server 4 estimates how the response time changes in an environment having different network quality from that of the environment already used not by actual operation, but using simulation. The capture server 4 focuses attention on the influence by packet loss in particular among the network quality at the time of the estimation. Then the capture server 4 calculates delay time by packet loss for each communication pattern in the remote desktop environment. The capture server 4 estimates the physical feeling quality by the user at the second point from a change in the response time at the second point in the remote desktop environment based on this calculation result.

Specifically, the capture server 4 estimates a response time at the second point based on the information on the number of losses of the packets that the client device 1 at the first point in FIG. 1 transmits and receives with the service server 2 through the network N1 and the delay time, and the network quality information at the second point. A quality estimation method according to the present embodiment, described below, is performed by the capture server 4. In the following, a description will be given of an example of a functional configuration of the capture server 4, and a quality estimation method by the capture server 4 in sequence.

Figure 3:
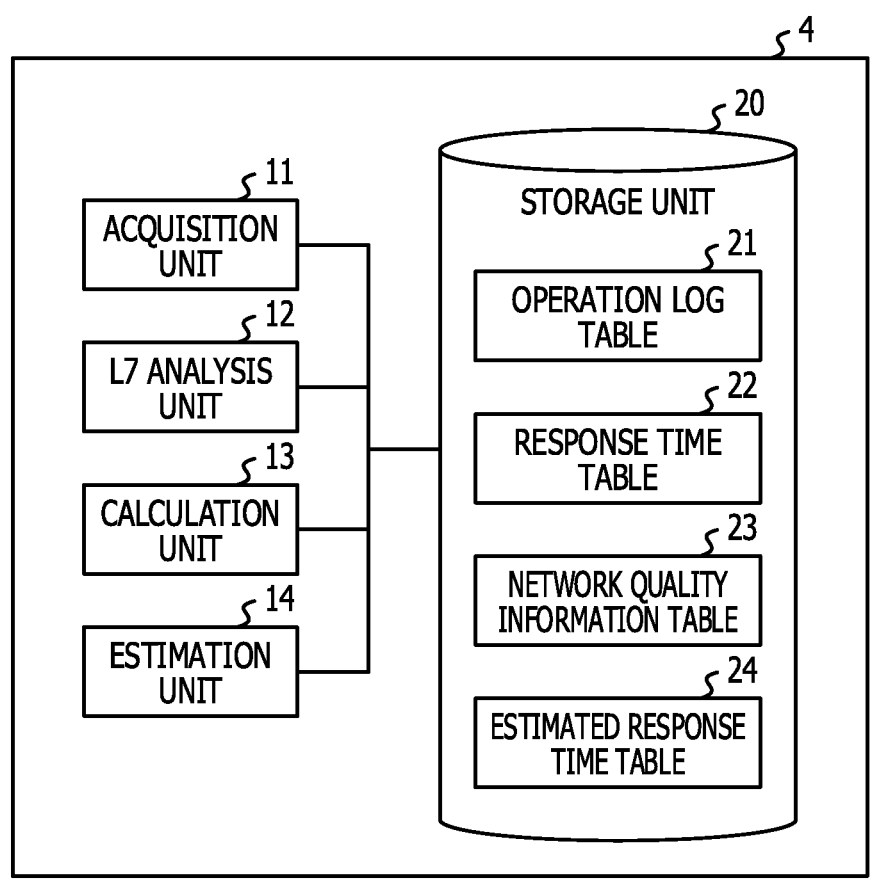
FIG. 3 is a diagram illustrating an example of a functional configuration of a capture server.

A description will be given of an example of a functional configuration of the capture server 4 according to the present embodiment with reference to FIG. 3. FIG. 3 is a diagram illustrating an example of a functional configuration of the capture server. The capture server 4 includes an acquisition unit 11, an L7 analysis unit 12, a calculation unit 13, an estimation unit 14, and a storage unit 20. The storage unit 20 stores an operation log table 21, a response time table 22, a network quality information table 23, and an estimated response time table 24.

The acquisition unit 11 obtains transmitted and received packets when the client device 1 at the first point uses the remote desktop environment of the service server 2. Specifically, the acquisition unit 11 obtains the operation command transmitted from the client device 1, and the drawing command transmitted from the service server 2, which have been subjected to port mirroring by the switch 3. The drawing command includes image data that has been subjected to drawing processing by the service server 2.

The L7 analysis unit 12 analyzes the operation command and the drawing command obtained by the acquisition unit 11. The L7 analysis unit 12 generates an operation log indicating the contents of the operation command and the drawing command, and writes the operation log into the operation log table 21.

The calculation unit 13 analyzes the transmitted and received packets obtained by the acquisition unit 11 to calculate the number of lost packets. The calculation unit 13 outputs statistics of delay time by packet losses, for example at least any one of a maximum value, a minimum value, and an average value based on the calculated number of lost packets, and the network quality information at a predetermined point (stored in the network quality information table 23 in FIG. 5). In the present embodiment, the network quality information at a predetermined point represents a packet loss rate, an RTT, and band information when the client device 5 uses the remote desktop environment of the service server 2 at a predetermined point.

The estimation unit 14 estimates a response time of the operation performed by the client device at the second point toward the service server 2 based on at least any one of the maximum value, the minimum value, and the average value of the calculated delay time. In the following, the response time estimated by the estimation unit 14 is also referred to as an "estimated response time".

Next, a description will be given of data structures of various kinds of data stored in the storage unit 20 of the capture server 4.

The operation log table 21 is a table in which operation log information of data of packets transmitted and received between the client device 1 and the service server 2 is recorded.

FIG. 4 is a diagram illustrating an example of operation log information stored in the operation log table 21. The operation log table 21 includes individual items of time information 211, client information 212, server information 213, type information 214, a command name 215, a command parameter 216, the number of packets 217, and an RTT 218. The time information 211 indicates transmission (or reception) time of the operation command or the drawing command.

The client information 212 indicates an IP address of the client device 1. The client information 212 may include a port number of the client device 1. The server information 213 indicates an IP address of the service server 2. The server information 213 may include a port number of the service server 2. The type information 214 indicates whether the transmitted packet is an operation command (Request) or a drawing command (Response). The command name 215 indicates the instruction contents of the operation command or the drawing command. The command parameter 216 indicates a parameter (argument) of the command name 215. In the movement of a window by a mouse, the user performs operation in order of "pressing mouse button"→"mouse cursor movement (plural)"→"pressing mouse button", and the operation commands arise in accordance with this. Drawing processing by the service server 2 is performed in accordance with each operation command, and a drawing command (including drawing data) is generated.

As an example, if a request is made with an identifier such as "MOUSE_MOVE X-coordinate, Y-coordinate", the operation command may include one command (MOUSE_MOVE), and data (X-coordinate, Y-coordinate) accompanying the command. The service server 2 may return a response including "SEND_DESK_PICTURE (X-coordinate, Y-coordinate, image data)" as a drawing command to the request. However, the configurations of the operation command and the drawing command are not limited to this.

The number of packets 217 indicates the number of packets included in the operation command or the number of packets included in the drawing command. The round-trip time (RU) 218 is a sum total of a time period from when the client device 1 has transmitted an operation command to when the service server 2 receives the operation command, and a time period from when the service server 2 has transmitted a drawing command as a response of the operation command to when the client device 1 receives the drawing command (refer to RU in FIG. 8). The RU 218 is one of the factors indicating a network delay.

FIG. 5 is a diagram illustrating an example of information stored in the response time table 22. The response time table 22 includes individual items of client information 221, server information 222, operation time information 223, drawing beginning data time information 224, drawing final data time information 225, response time information 226, RU 227, processing time information 228, retransmission time information 229, and transfer time information 230.

The client information 212, the server information 213, the time information 211, and the RU 218 that are related to the relevant operation command of the operation log table 21 are transcribed into the client information 221, the server information 222, the operation time information 223, and the RU 227, respectively. For example, values of the corresponding items concerning the operation command in the (1) row in FIG. 4 are transcribed into the client information 221, the server information 222, the operation time information 223, and the RU 227, respectively, in the (3) row in FIG. 5.

The transmission (or reception) time of the beginning drawing command indicated by (2-1) for the operation command of (1) in FIG. 4 is stored in the drawing beginning data time information 224. The transmission (or reception) time of the beginning drawing command indicated by (2-4) for the operation command of (1) in FIG. 4 is stored in the drawing final data time information 225.

The response time information 226 is calculated from the operation time information 223 of the client device 1, and the drawing final data time information 225. The response time information 226 stores the time difference between the transmission (or reception) time of the operation command of the client device 1, and the transmission (or reception) time of the drawing final data (FLUSH command) corresponding to the operation.

The processing time information 228 stores time when the service server 2 performed the drawing processing for the operation command. The transfer time information 230 indicates a remaining time produced by subtracting the time indicated by the processing time information 228 from the time indicated by the response time information 226. The retransmission time information 229 indicates the retransmission time of a lost packet when a packet loss has occurred. At this point in time, retransmission has not occurred, and thus a default value of 0 is set in the retransmission time information 229.

The network quality information table 23 stores network quality information when each client device uses the remote desktop environment of the service server 2 at each observation point, such as the first point, the second point, and the like. FIG. 6 is a diagram illustrating an example of information stored in a network quality information table 23. In the network quality information, a band, an RTT, and a packet loss rate are stored, for example. In FIG. 6, the band is set to "10 Mbps", the RTT is set to "10 milliseconds", and the packet loss rate is set to "3%".

FIG. 7 is a diagram illustrating an example of information stored in the estimated response time table 24. The estimated response time table 24 includes individual items of client information 241, server information 242, operation time information 243, drawing beginning data time information 244, drawing final data time information 245, response time information 246, RTT 247, processing time information 248, retransmission time information 249, and transfer time information 250.

The corresponding items of the response time table 22 in FIG. 5 are transcribed into the client information 241, the server information 242, the operation time information 243, the drawing beginning data time information 244, the drawing final data time information 245, the RTT 247, the processing time information 248, and the transfer time information 250.

The response time information 246 indicates an estimated response time for the remote operation performed by the client device 5 when the client device 5 at the second point uses the service server 2. The response time information 246 is calculated based on at least any one of the maximum value, the minimum value, and the average value of the calculated delay time. In the example in FIG. 7, the maximum value of the delay time calculated by the quality estimation method described later is stored in the response time information 246. Not only the maximum value of the calculated delay time, but also the minimum value and the average value of the delay time may be stored in the response time information 246. The retransmission time information 249 indicates the retransmission time of a packet when packet loss has occurred.

Figure 8:
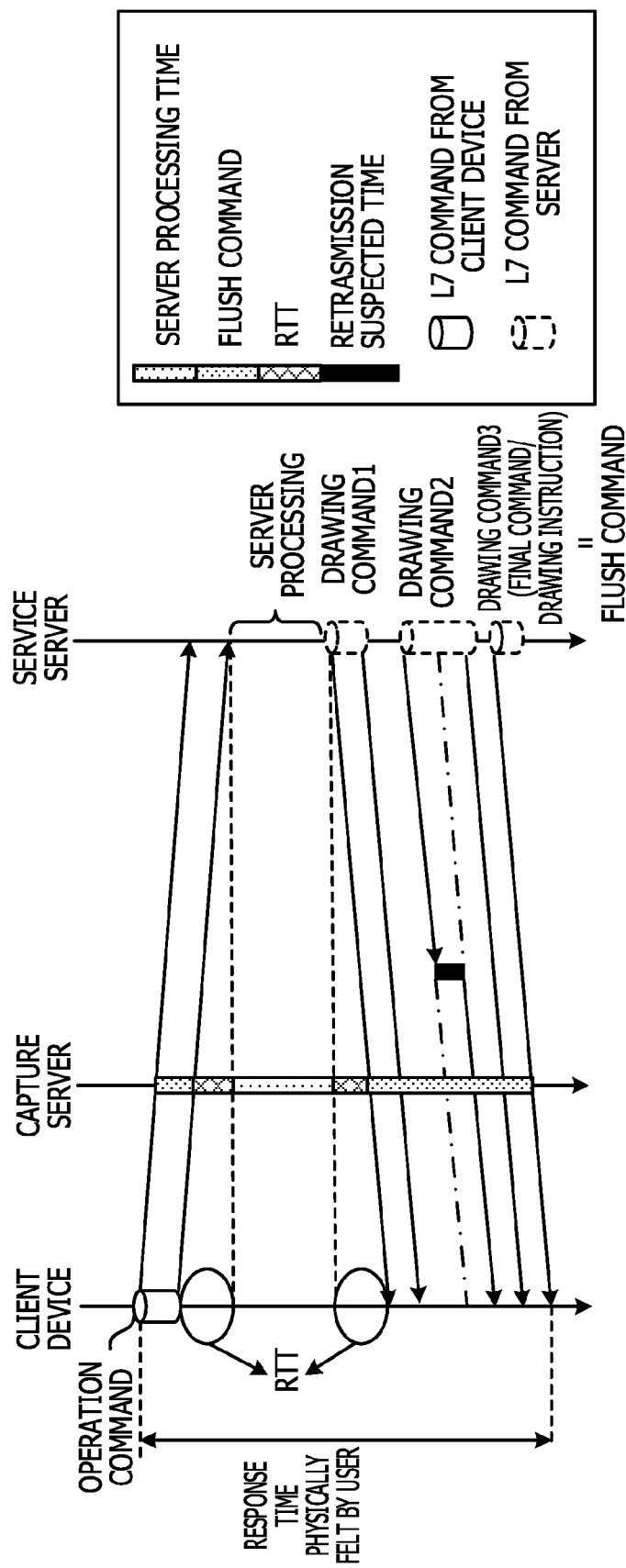
FIG. 8 is an explanatory diagram of influence of a packet loss on physical feeling quality.

The factors indicating a network delay includes a packet loss rate in addition to the RTT described above. FIG. 8 is an explanatory diagram of influence of a packet loss on physical feeling quality. In FIG. 8, the number of packet losses indicates the number of losses of the packets of the operation command transmitted by the client device 1, and the packets of the drawing commands 1 to 3 transmitted by the service server 2. The packet loss rate indicates the ratio of the number of lost packets to the total number of packets included in the operation command transmitted by the client device 1, and the drawing commands 1 to 3 transmitted by the service server 2. In FIG. 8, the service server 2 divides the image data generated by performing predetermined drawing processing into a plurality of packets, includes the packets in the drawing commands 1 to 3, and transmits the commands.

In the network quality information, it is possible to calculate a minimum response time for interactive operation using the RTT. For example, as illustrated in FIG. 8, it is possible to calculate a delay time denoted by an ellipse, which is produced by subtracting the processing time of the service server 2 from a time period while the client device 1 has transmitted the operation command to the service server 2, and the client device 1 receives the first drawing command 1 from the service server 2, using the RTT.

If the RTT is only used for quality evaluation of a network, there are cases where the quality evaluation of a network is different from the physical feeling quality actually felt by a user. One of the reasons for this is that there are two methods of retransmission when a packet loss occurs, and a different retransmission method has a different length in retransmission time.

Figure 9B:
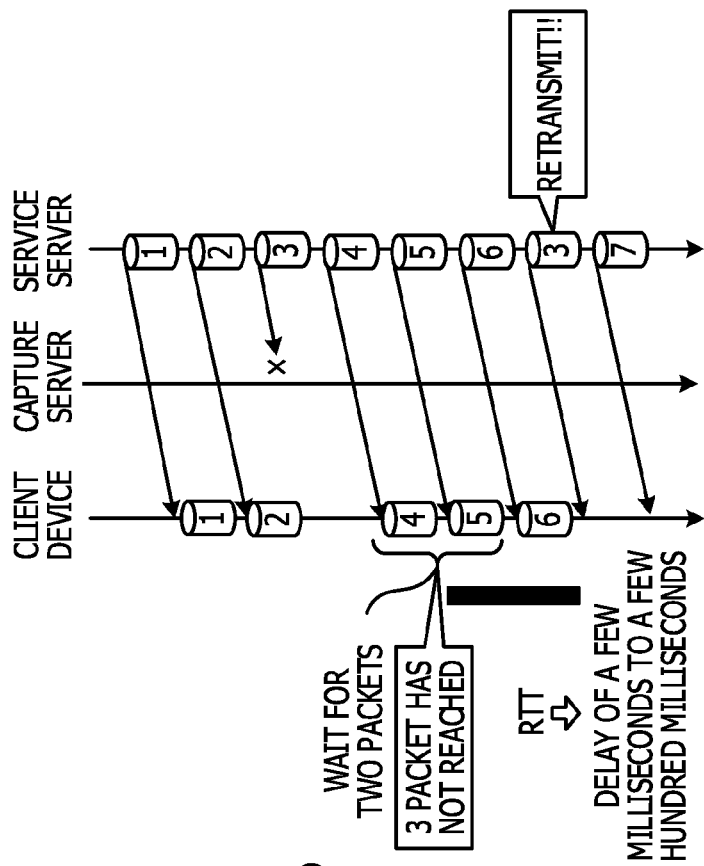
FIG. 9A and FIG. 9B are explanatory diagrams of a delay by RTO, and a delay by FR, respectively.
Figure 9A:
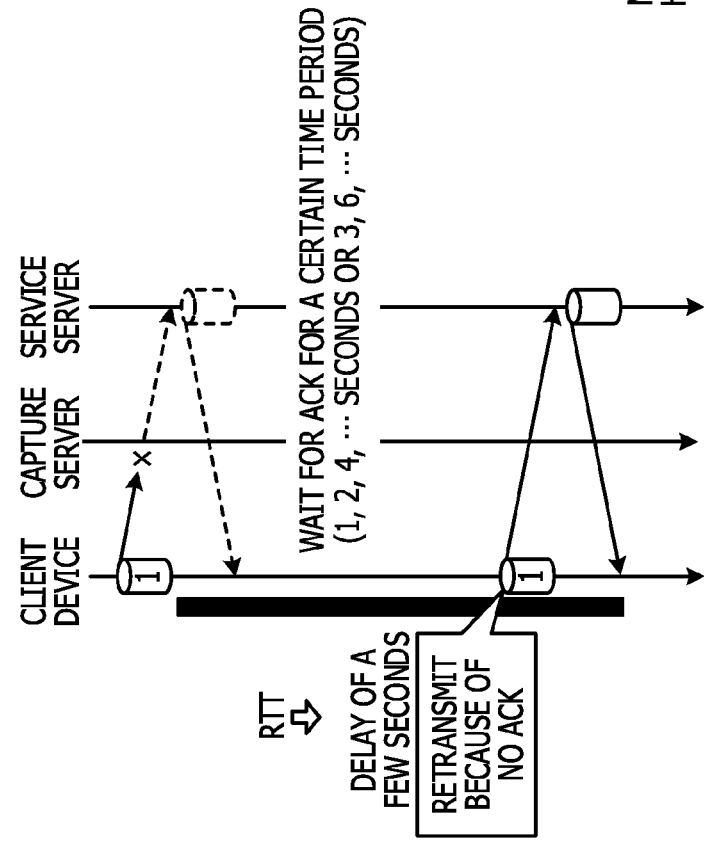

Description will be given of the two methods of retransmitting a packet when packet loss has occurred with reference to FIG. 9A and FIG. 9B. FIG. 9A and FIG. 9B are explanatory diagrams of a delay by RTO, and a delay by FR, respectively. In the first retransmission method illustrated in FIG. 9A, the client device 1 transmits a packet 1 to the service server 2, and waits for arrival of ACK indicating the reception of the packet 1. If ACK is not received after a lapse of a predetermined time period, the packet 1 is retransmitted. In this case, the retransmission timing is one second, two seconds, four seconds . . . , or three seconds, six seconds . . . . In this retransmission method, the delay by packet loss of the RTT becomes at least a few seconds. The delay by packet loss in this retransmission method is referred to as retransmit time out (RTO). The shortest time of the delay time by the RTO is "one second" in the case of retransmission performed at one second after transmission of the packet 1.

In the second retransmission method illustrated in FIG. 9B, the client device 1 receives a plurality of packets from the service server 2. The client device 1 waits for a time for two packets from timing at which a packet ought to arrive in consideration of the fact that the client device 1 does not have to receive packets in the same sequence of the packets transmitted by the service server 2. Here, the client device 1 has not received a packet 3 to arrive, and thus client device 1 waits for arrival of the two packets, packets 4 and 5.

As a result, if the packet 3 has not reached after the client device 1 waits for arrival of two packets, the client device 1 sends a retransmission request of the lost packet 3. Upon receiving the retransmission request, the service server 2 retransmits the lost packet 3 immediately. In this retransmission method, retransmission timing is when packets due to arrive have not arrived, and after a lapse of time for two packets. The delay by packet loss in this retransmission method is referred to as fast retransmit (FR). The delay time by the FR becomes from a few milliseconds to hundreds of milliseconds.

FIG. 10 is a diagram illustrating a delay time by packet loss in each unit in communication. In a remote desktop environment, it is understood that communication patterns as illustrated in FIG. 10 are repeated asynchronously. In (A) in FIG. 10, operation commands for small-sized user operation are transmitted and received. In this case, a single packet is generally transmitted sporadically. In (B) in FIG. 10, drawing processing at the server is executed. In (C) in FIG. 10, relatively large-sized drawing data is transmitted and received. In this case, a plurality of packets are transmitted continuously. In (D) in FIG. 10, relatively small-sized drawing data, and a drawing instruction command are transmitted and received. In this case, a single packet is transmitted.

In such communication patterns, it is possible to define the delay time by packet loss that occurs in each of the parts (A) to (D) by the following.

(A) Retransmit Time Out (RTO)
(B) (Packet loss does not occur)
(C) Fast Retransmit
(D) RTO As a result, it is understood that the delay by packet loss that occurs in (A), (C), and (D) is the delay by packet loss due to either RTO or FR. In (B), packet loss does not occur, and thus a delay time does not arise.

Next, a detailed description will be given of a delay time by packet loss that occurs in each of (A) to (D). In an actual sequence, the delay time by loss in each of (A) to (D) becomes as follows.

Figure 11:
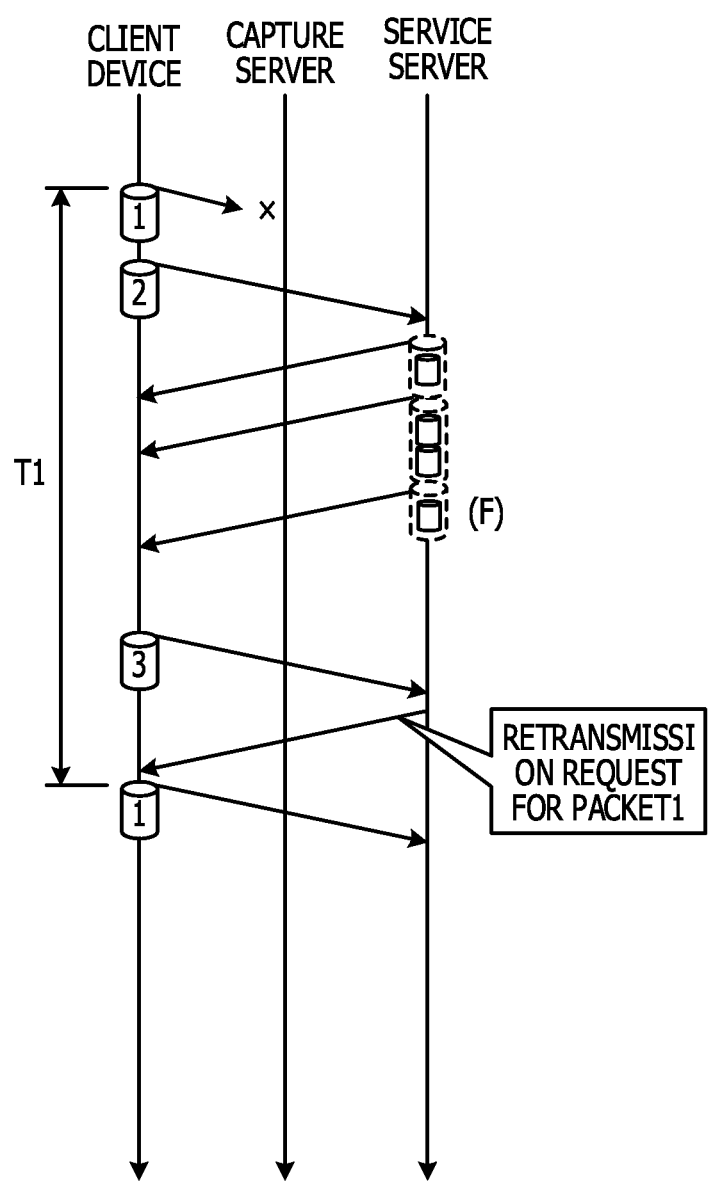
FIG. 11 is an explanatory diagram of a delay time by packet loss of an operation command.

In (A) in FIG. 10, if the occurrence interval of operation commands is less than an RTO value, the delay time follows that. For the delay by packet loss that occurs in (A) in FIG. 10, a description will be given later with reference to FIG. 11. FIG. 11 is an explanatory diagram of a delay time by packet loss of the operation command.

In (B) in FIG. 10, packet loss does not occur.

In (C) in FIG. 10, delay by Fast Retransmit occurs.

In (D) in FIG. 10, the delay time follows a shorter one of a time period from the immediately before FLUSH command to the drawing command including image data of the frame immediately after that, and the RTO time. A description will be given later of the delay of the packet loss that occurs in (D) in FIG. 10 with reference to FIG. 12.

(A) Delay by Packet Loss of Operation Command

The delay that occurs in (A) in FIG. 10 is the delay by the packet loss of the operation command. In this case, retransmission occurs in accordance with a time period of a shorter one of the following (A-1) time or (A-2) time. That is to say, a shorter one of the (A-1) time and the (A-2) time becomes the delay time by packet loss that occurs in (A) in FIG. 10.

(A-1) RTO Time

In an environment having a long operation interval, it takes a long time to transmit the next packet, and thus retransmission due to RTO occurs. That is to say, for the delay time, it is possible to use an RTO value. When the RTO value is "one second", if a time T1 (a time period from the loss of a packet 1 to the reception of a retransmission request of the packet 1) illustrated in FIG. 11 is longer than one second, packet retransmission is carried out in the case where ACK is not received by RTO before a retransmission request of the packet 1 by FR illustrated in FIG. 11. In this case, for the lost delay time, it is possible to use the RTO value (for example, "one second").

(A-2) Time Until Operation Commands for Two Times are Transmitted to Server

In an operation command, such as a mouse move, or the like, a transmission interval becomes short. For example, if the transmission interval becomes about 10 milliseconds, the time T1 illustrated in FIG. 11 becomes about tens of milliseconds, which is lower than the RTO value. In this case, retransmission of the packet occurs in accordance with Fast Retransmit. That is to say, the delay time of packet loss becomes a time period from the transmission of the operation command of the packet 1 to the transmission of the operation command after two times of transmission.

In this manner, if the time period from the transmission of the operation command to the retransmission is less than "one second" of the RTO value, a delay time in accordance with the FR packet loss is applied to the delay time by the packet loss of the operation command in (A) in FIG. 10. On the other hand, if a time period from the transmission of the operation command to the retransmission is "one second" of the RTO value or more, the delay time of "one second" of the RTO value is applied to the RTO packet loss. However, in the present embodiment, a description will be given on the assumption that the RTO value is set to "one second". However, the RTO time may be two seconds or more.

(C) Delay by Packet Loss of Drawing Command (Image Data)

The delay that occurs in (C) in FIG. 10 is the delay by the packet loss of the drawing command (image data). In (C) in FIG. 10, the delay by Fast Retransmit occurs. That is to say, after a packet is lost, the client device 1 waits for a time of two packets, and then transmits a notification of a packet loss and a retransmission request to the service server 2. The service server 2 that has received the retransmission request retransmits the lost packet immediately. That is to say, it is possible to use RTT (+α) for the delay time by Fast Retransmit.

(D) Delay by Packet Loss of FLUSH Command (Final Drawing Command)

The delay that occurs in (D) in FIG. 10 is the delay by the packet loss of the final drawing command (image data). In this case, retransmission occurs in accordance with a shorter one of the time of the following (D-1) and the time of (D-2). That is to say, the shorter one of the time of (D-1) and the time of (D-2) becomes the delay time by packet loss that occurs in (D) in FIG. 10.

(D-1) RTO Time

In an environment having a long drawing interval, it takes a long time to transmit the next frame, and thus retransmission by RTO occurs. That is to say, in this case, for the delay time, it is possible to use "one second" of the RTO value.

(D-2) Time Until Image Data of Immediately after Frame

Figure 12:
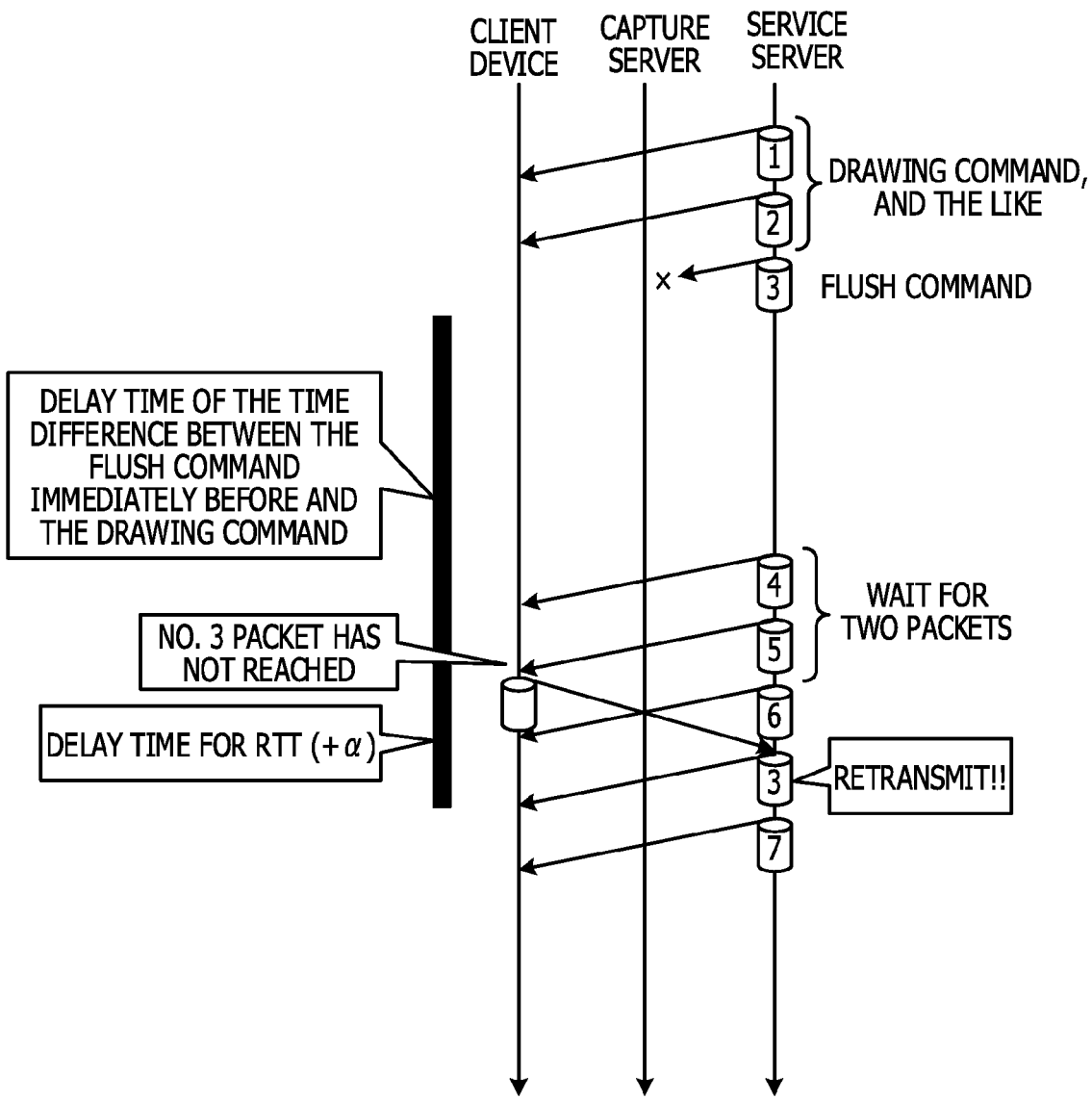
FIG. 12 is an explanatory diagram of a delay time by packet loss of a FLUSH command.

When a packet is lost, the loss is found at the point in time when the second drawing command in the next frame has arrived. FIG. 12 is an explanatory diagram of a delay time by packet loss of a FLUSH command. As illustrated in FIG. 12, after the client device 1 lost the packet of the final drawing command (FLUSH command), the client device 1 waits for two packets in the next frame, and then transmits a retransmission request of the lost packet. The service server 2 that has received the retransmission request retransmits the lost packet immediately. That is to say, for the delay time in this case, it is possible to use the sum of a time period from when the FLUSH command immediately before has been transmitted to when the drawing command for two packets is transmitted, and a time period of RTT (+α).

In the case, such as scroll drawing by pressing a mouse button, the speed that a human user is allowed to operate a keyboard is sufficiently slow compared with the processing power of a computer. On the other hand, cursor position information by mouse operation is often notified with elaborate input operation. In consideration of such an operation interval, the delay time by packet loss in (A) becomes a shorter one of the RTO time, and a time period until the operation commands for two times are sent to the service server 2 in accordance with the FR depending on the length of the transmission interval of the operation command. In the same manner, the delay time by packet loss in (D) becomes a shorter one of a time period until the drawing command for two packets in the next frame of the FLUSH command is sent to the service server 2 in accordance with the FR, and the RTO time.

Next, a description will be given of calculation of a delay time by the packet loss that occurs in each of the parts (A), (C), and (D). In a quality estimation method according to the present embodiment, the delay time by packet loss is calculated by the following steps (1) to (3).

(1) Calculate the number of lost packets in accordance with the packet loss rate.

(2) Allocate the number of lost packets to the three parts, namely the operation command, the image data, and the FLUSH command, and calculate the delay time for the respective parts.

(3) Obtain the maximum value and the minimum value among the delay times calculated in (2), and determine the respective values to be the minimum value and the maximum value of the influence when a loss occurs in the sequence. In the present embodiment, a range of the minimum and the maximum of the delay time is presented to a user so that it is possible to notify to what extent the packet loss influences the operation to the user. It is possible to estimate network quality based on the minimum value, the maximum value, and the average value of the calculated delay time.

Figure 13:
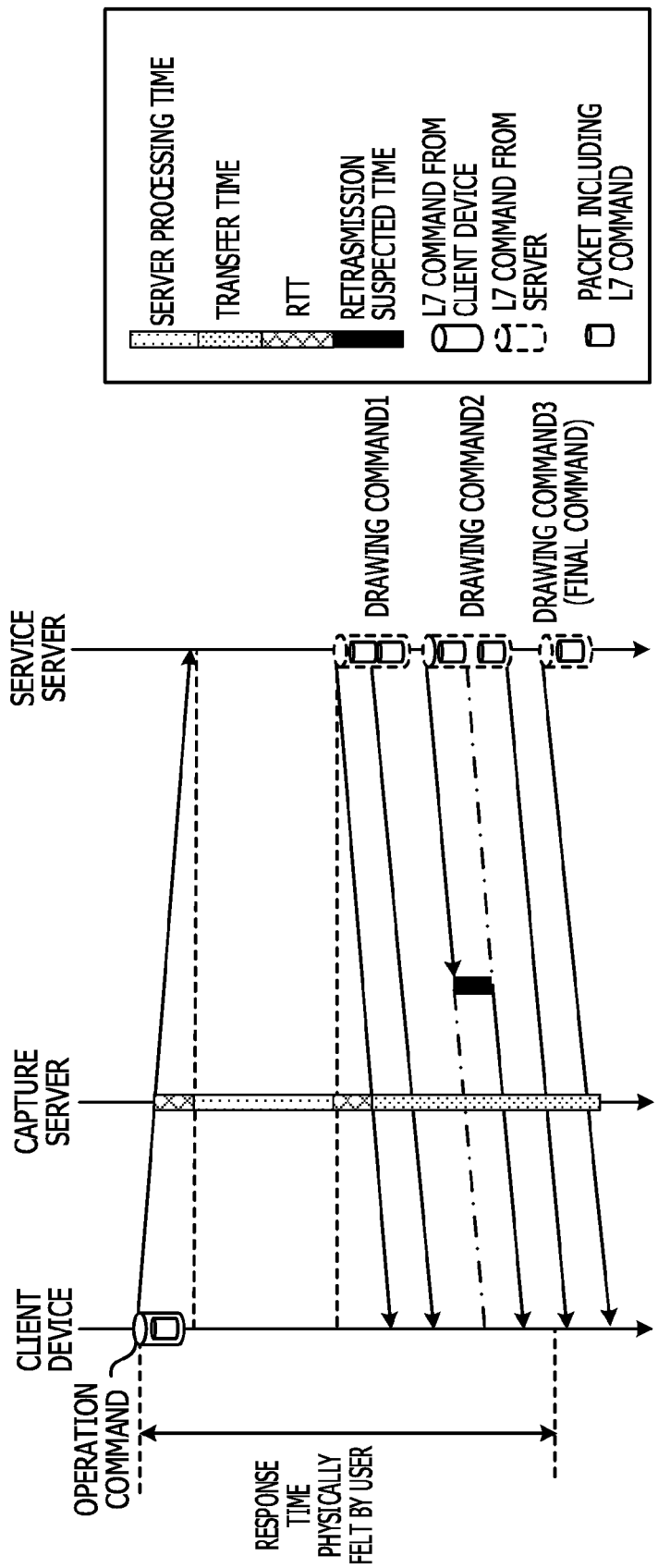
FIG. 13 is an explanatory diagram of a delay time in accordance with a packet loss rate.

FIG. 13 is an explanatory diagram of a delay time in accordance with a packet loss rate. For example, as illustrated in FIG. 13, when the client device 1 has transmitted the operation command, the service server 2 that receives this command performs drawing processing, and transmits the drawing commands 1 to 3, the number of packets transmitted and received becomes six packets in total. The storage unit 20 stores the number of packets.

Next, the calculation unit 13 calculates the number of lost packets in accordance with the packet loss rate stored in the network quality information table 23. Here, assuming that the packet loss rate is 3%, for example, the number of lost packets becomes 6 [pieces]×0.03=0.18. In this case, in the present embodiment, in order to estimate the "influence of packet loss", the number of lost packets is rounded up to one piece.

As one of the methods of determining a packet loss rate, a method is provided in which a client device at an observation point, such as the second point in FIG. 1, or the like executes the ping command to the server, and a loss rate that is finally output as statistics is used. The other methods used for determining the packet loss rate include a method of using a network measurement system, a method of using a suitable value as an approximate value, or the like.

When the number of lost packets is allocated to three parts, that is to say, the operation command (refer to (A) in FIG. 10), the image data (refer to (C) in FIG. 10), and the FLUSH command (refer to (D) in FIG. 10), the delay time for the respective parts are calculated. Here, what are to be calculated finally are the minimum and maximum range of the delay time in order for a user to know to what extent the packet loss influences the operation.

Figure 14:
FIG. 14 is a diagram illustrating patterns of a delay time in accordance with a packet loss rate.

FIG. 14 is a diagram illustrating patterns of delay time in accordance with a packet loss rate. For the best candidate of the delay time, the following cases of "a" and "b" are given.
a. The case where a packet loss occurs with the operation command, and Fast Retransmit is not applied to the delay time by loss. b. The case where a packet loss occurs with the FLUSH command, and Fast Retransmit is not applied to the delay time by loss.

For the least candidate of the delay time, the following case of "c" is given. c. The case where a packet loss occurs with the image data (that is to say, Fast Retransmit is applied to the delay time by loss)

The calculation unit 13 calculates the delay time that is assumed for the above-described "a", "b", and "c". If there are a plurality of lost packets, the calculation unit 13 calculates the delay time in four ways, that is to say, "a", "a+b", "b", and "c" illustrated in FIG. 14. The "a+b" is the case where packet losses occur with the operation command and the FLUSH command.

Figure 15A:
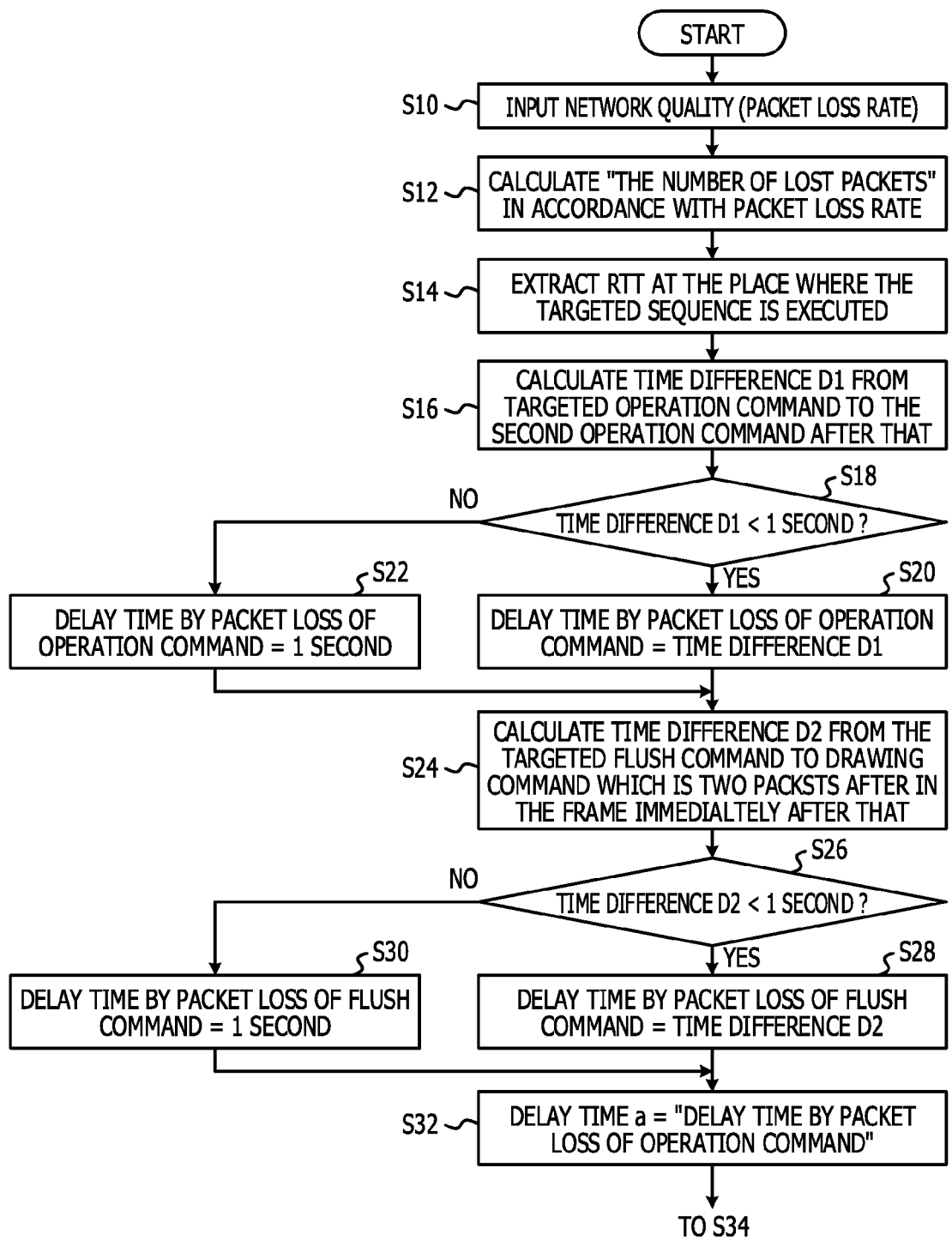
FIG. 15A and FIG. 15B are flowcharts illustrating an example of quality estimation processing by calculation of a delay time in accordance with a packet loss rate.
Figure 15B:
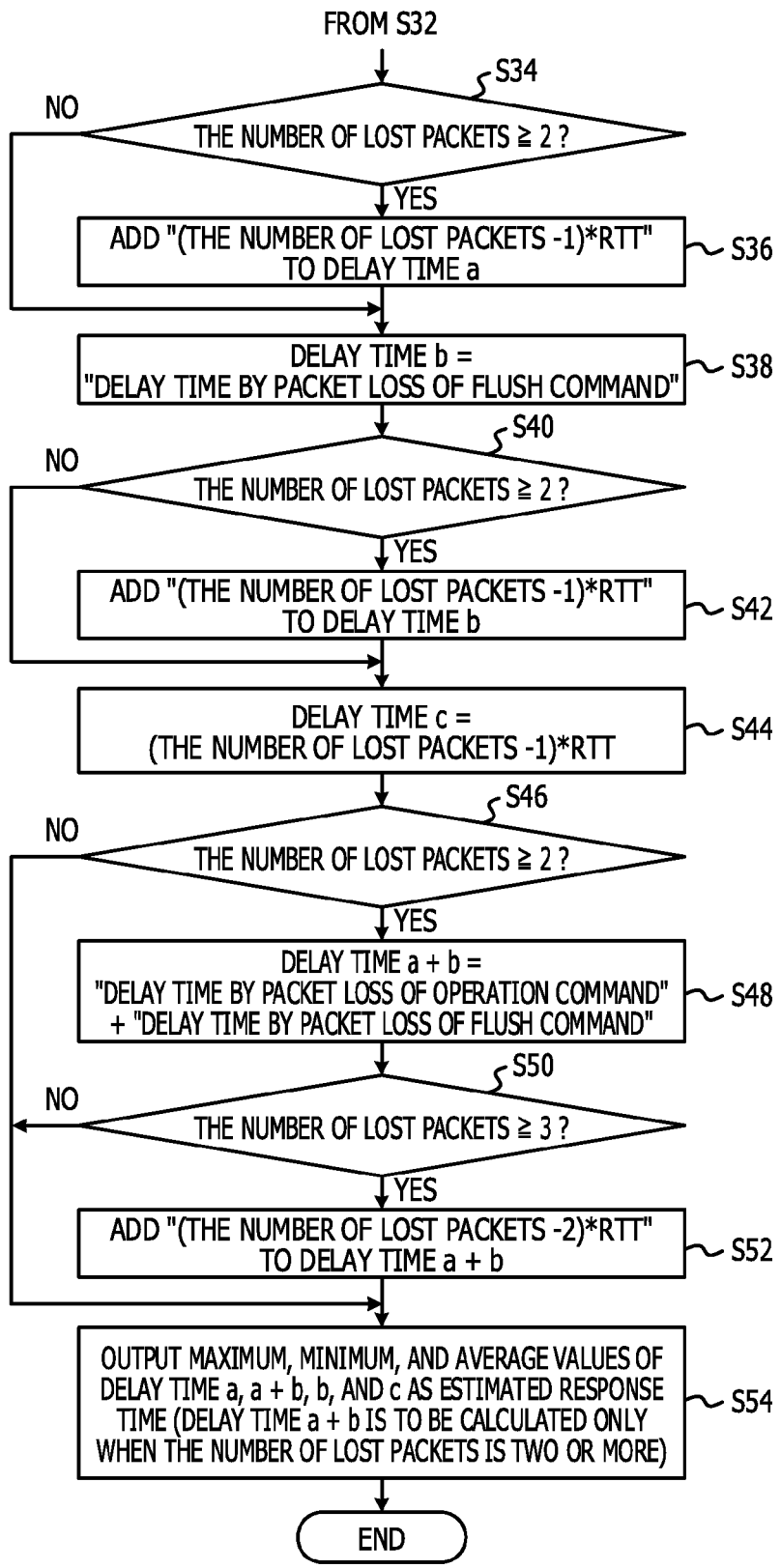

Next, a description will be given of a quality estimation method according to the present embodiment with reference to FIG. 15A and FIG. 15B. FIG. 15A and FIG. 15B are flowcharts illustrating an example of quality estimation processing by calculation of a delay time in accordance with a packet loss rate.

When quality estimation processing by calculation of a delay time in FIG. 15A and FIG. 15B is started, network quality information at an observation point, such as the second point, or the like is input. The calculation unit 13 obtains a packet loss rate of the observation point from the network quality information table 23 (S10).

The calculation unit 13 calculates "the number of lost packets" in accordance with the packet loss rate (S12). Next, the calculation unit 13 extracts an RTT value of the place where a targeted sequence is executed from the RTT 218 item in the operation log table 21 (S14).

Next, the calculation unit 13 calculates a time difference D1, which is the time difference from the targeted operation command to the second operation command after that (S16). Next, the calculation unit 13 determines whether the time difference D1 is less than one second or not (S18). If determined that the time difference D1 is less than one second, the calculation unit 13 calculates that the delay time by packet loss of the operation command is the time difference D1 (S20). On the other hand, if determined that the time difference D1 is one second or more, the calculation unit 13 calculates that the delay time by packet loss of the operation command is one second, which is the RTO time (S22).

Next, the calculation unit 13 calculates the time difference D2 from the targeted FLUSH command to the drawing command of after two packets in the frame immediately after that (S24). Next, the calculation unit 13 determines whether the time difference D2 is less than one second or not (S26). If determined that the time difference D2 is less than one second, the calculation unit 13 calculates that the delay time by packet loss of the FLUSH command is the time difference D2 (S28). On the other hand, if determined that the time difference D2 is one second or more, the calculation unit 13 calculates that the delay time by packet loss of the FLUSH command is one second, which is the RTO time (S30).

Next, the calculation unit 13 assigns the calculated delay time by packet loss of the operation command to the delay time a in the case where a packet loss occurs with the operation command (S32). Next, the calculation unit 13 determines whether the number of lost packets is two or more (S34). If the number of lost packets is two or more, as illustrated in FIG. 14, the packet losses of the second and after having the delay time a occur at transmission time of image data. Accordingly, if the calculation unit 13 determines that the number of lost packets is two or more, the calculation unit 13 adds the value of "(the number of lost packets−1)×RTT" to the delay time a (S36). If the calculation unit 13 determines that the number of lost packets is less than 2, the processing proceeds to S38.

Next, the calculation unit 13 assigns the calculated delay time by packet loss of the FLUSH command to the delay time b in the case where a packet loss occurs with the FLUSH command (S38). Next, the calculation unit 13 determines whether the number of lost packets is two or more (S40). If the number of lost packets is two or more, as illustrated in FIG. 14, the packet loss of the second and after having the delay time b occurs at transmission time of the image data. Accordingly, if the calculation unit 13 determines that the number of lost packets is two or more, the calculation unit 13 adds the value of "(the number of lost packets−1)×RTT" to the delay time b (S42). If the calculation unit 13 determines that the number of lost packets is less than 2, the processing proceeds to S44.

Next, the calculation unit 13 assigns the calculated time by (the number of lost packets×RTT) to the delay time c in the case where a packet loss occurs only with the image data (S44). Next, the calculation unit 13 determines whether the number of lost packets is two or more (S46). If the calculation unit 13 determines that the number of lost packets is not two or more, the processing proceeds to S54. On the other hand, if the calculation unit 13 determines that the number of lost packets is two or more, the calculation unit 13 adds the delay time by packet loss of the operation command, and the delay time by packet loss of the FLUSH command. Then the calculation unit 13 assigns the sum time to the delay time a+b in the case where packet losses occur with the operation command and the FLUSH command (S48).

Next, the calculation unit 13 determines whether the number of lost packets is three or more (S50). If the number of lost packets is three or more, as illustrated in FIG. 14, the packet losses of the third and after having the delay time "a+b" occur at transmission time of image data. Accordingly, if the calculation unit 13 determines that the number of lost packets is three or more, the calculation unit 13 adds the value of "(the number of lost packets−2)×RU" to the delay time a+b. (S52). If the calculation unit 13 determines that the number of lost packets is less than 3, the processing proceeds to S54.

Next, the estimation unit 14 outputs, as an estimated response time, the maximum, the minimum, and the average values of the calculated delay time a, a+b, b, and c (S54), and terminates this processing. The delay time a+b becomes the target of calculation only in the case where the number of packet losses is two or more. The estimation unit 14 may output, as an estimated response time, at least any one of the maximum, the minimum, and the average value of the calculated delay time a, a+b, b, or c.

Specific Example of Quality Estimation

In the following, a description will be given of a specific example of calculating an estimated response time estimating the influence by packet losses in the remote desktop environment based on the information in the operation log table 21 illustrated in FIG. 4.

The calculation unit 13 calculates the number of lost packets in accordance with the packet loss rate. At that time, the calculation unit 13 extracts the user operation (operation command) and the drawing data group (drawing command) from the operation log table 21 in FIG. 4 based on the operation time information 223, the drawing beginning data time information 224, and the drawing final data time information 225 described in the response time table 22 in FIG. 5. In the example in FIG. 4 according to the present embodiment, the rows denoted by (1) and (2-1) to (2-4) in the operation log table 21 are the user operation and the drawing data group, respectively.

The calculation unit 13 calculates the number of packets included in the extracted user operation and drawing data group. A number following "packetNum=" in the number of packets 217 described at the end of each row represents the number of packets included in data of each row. In the example in FIG. 4, 44 (=1+1+39+2+1) pieces of packets are included in total.

Next, referring to the network quality information table 23 illustrated in FIG. 6, it is specified that the packet loss rate is 3%. Accordingly, the calculation unit 13 calculates that the number of lost packets is two by the following calculation.

44×0.03=1.32→The decimal places are rounded up, and thus the number of lost packets is "two".

The calculation unit 13 allocates the number of lost packets to three parts, namely the operation command, the image data, and the FLUSH command so as to calculate the delay time for the respective parts.

The time difference between the operation time of the operation command illustrated by (1) in the operation log table 21, and the operation time of the second operation command after that is less than one second. Accordingly, the calculation unit 13 assigns the time difference D1 between the operation command indicated by (1), and the second operation command after that to the delay time a that is lost by the operation command. Specifically, the delay time a by packet loss of the operation command is calculated as follows.

The delay time a=0.165267 second (=10:58:35.683401−10:58:35.518134).

The number of lost packets is 2, and thus one RTT is added so that the delay time a=0.165332 seconds (=0.165267+0.000065).

The delay time c by packet loss of the image data is calculated as follows. The delay time c=0.000130 second (=2×0.000065).

The delay time b by packet loss of the FLUSH command is calculated as follows. The time difference between the drawing command (2-5), which is two packets after in the immediately after frame of the FLUSH command in FIG. 4, and the FLUSH command is less than one second, and thus the time difference is used for the delay time. The delay time b=0.000001 second (=10:58:35.693234−10:58:35.693233).

The number of lost packets is 2, and thus one RTT is added so that the delay time b=0.000066 second (=0.000001+0.000065).

FIG. 16A, FIG. 16B, FIG. 16C, and FIG. 16D are diagrams illustrating information of individual tables to be used for calculation of a delay time in accordance with a packet loss rate. FIG. 16A, FIG. 16B, FIG. 16C, and FIG. 16D illustrate information stored in the individual tables to be used for calculating the delay time in accordance with the packet loss rate by the above-described example. FIG. 16A illustrates an example of the response time table 22. The calculation unit 13 calculates each delay time a, a+b, b, and c using each data illustrated in FIG. 16A. As a result, the delay time a, b, and c that are calculated by the calculation unit 13 with respect to the information of the operation log in FIG. 16A are illustrated in FIG. 16D. In this example, the delay time a due to the occurrence of a packet loss with the operation command becomes "0.165332 seconds", which is the maximum value of the delay time by packet loss. The delay time b due to the occurrence of a packet loss with the FLUSH command (final drawing command) becomes "0.000066 second", which is the minimum value of the delay time by packet loss. The delay time c due to the occurrence of a packet loss with image data (not final drawing command) becomes "0.000130 second".

In FIG. 16B, an estimated response time "0.340431 second" in the case where the delay time is a maximum (here, a packet loss by the operation command) is stored in the response time information 246. The maximum value of the delay time "0.340431 second" is obtained by adding the delay time a "0.165332 seconds" to the response time "0.175099 second" of the response time information 226 stored in the response time table 22.

In FIG. 16C, an estimated response time "0.175165 second" in the case where the delay time is a minimum (here, a packet loss by the FLUSH command) is stored in the response time information 246. The minimum value of delay time "0.175165 second" is obtained by adding the delay time b "0.000066 seconds" to the response time "0.175099 second" of the response time information 226 stored in the response time table 22.

As described above, in the remote desktop system 10 according to the present embodiment, the maximum value and the minimum value of the response time when the client device 1 receives a service from the service server 2 at the observation point is calculated based on the network quality information.

From the maximum value and the minimum value among the calculated delay time, the maximum value and the minimum value under the influence of the occurrence of packet loss in that sequence are obtained. This minimum and maximum range is presented to a user so that it is possible to inform the user to what extent the operation is influenced when packet loss occurs without actual measurement. Thereby, it is possible for the user to obtain information on the physical feeling quality indicating whether it is difficult to use or easy to use the remote desktop at an observation point without actually using a remote desktop environment at the observation point.

FIG. 17 is a diagram illustrating an output example of an estimated response time. The service server 2 may obtain the maximum value and the minimum value among the delay time a, b, c, and a+b, which were calculated in the above, and may present the maximum value and the minimum value to the user as the minimum value and the maximum value of the influence when packet loss occurs in the sequence.

The service server 2 may present the range of the calculated minimum value and maximum value, the average value of the delay time a, b, c, and a+b, which were calculated in the four ways, to the user. In this manner, the service server 2 presents the response time in consideration of the minimum to the maximum delay time in a specified packet loss rate to the user. Thereby, it is possible for the user to obtain indicators of a best physical feeling quality, a worst physical feeling quality, and an average physical feeling quality when the client device performs data communication with the service server 2 at the observation point. Thereby, it is possible for the user to determine whether a targeted system is suited to the specification under a requisite condition from the graph indicating the estimated response time in FIG. 17 without performing actual measurement.

In FIG. 17, three graphs, that is to say, the minimum value, the average value, and the maximum value of the estimated response time are displayed as an estimation result. However, depending on a user, it is possible for the user to view only the worst value, or the like, for example. That is to say, an estimated response time to be presented to the user as an estimation result ought to be at least any one of the minimum value, the average value, and the maximum value of the estimated response time.

As described above, with the remote desktop system 10 according to an embodiment, it is possible to estimate a response time in the case of using network quality information in another environment (a predetermined point) based on the response time observed in the actually used environment, and to display the response time to a user. Thereby, it is possible for the user to estimate a response time in the case of using the network quality information in another environment without performing actual measurement, and to determine whether practical use is allowed or not in accordance with the response time in advance.

Figure 18:
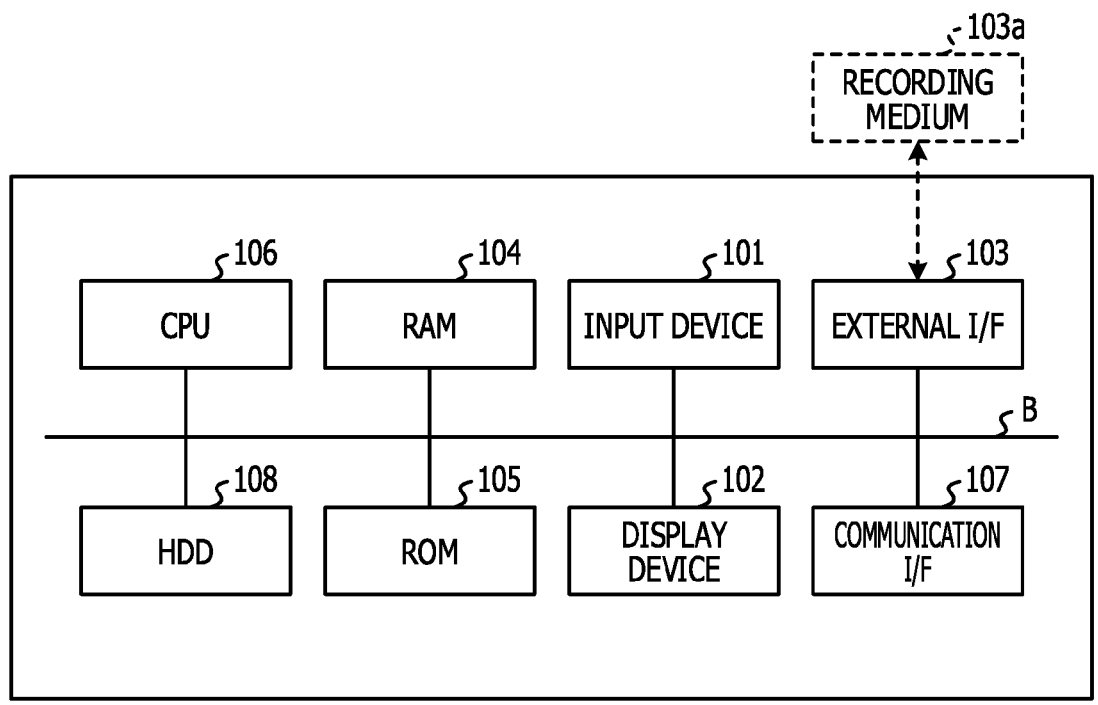
FIG. 18 is a diagram illustrating an example of a hardware configuration of a service server.

Finally, a description will be given of an example of a hardware configuration of the service server 2 according to the present embodiment with reference to FIG. 18. FIG. 18 is a diagram illustrating an example of a hardware configuration of the service server 2.

The service server 2 includes an input device 101, a display device 102, an external I/F 103, a random access memory (RAM) 104, a read only memory (ROM) 105, a central processing unit (CPU) 106, a communication I/F 107, and a hard disk drive (HDD) 108. Each unit is mutually connected through a bus B.

The input device 101 includes a keyboard, a mouse, and the like, and is used for inputting data to the service server 2. The display device 102 includes a display, and displays various processing results.

The communication I/F 107 is an interface that connects the service server 2 to a network. Thereby, it is possible for the service server 2 to perform data communication with the client device 1 through the communication I/F 107.

The HDD 108 is a nonvolatile storage device that stores programs and data. The programs and data to be stored include basic software that controls the overall apparatus, and application software. For example, the HDD 108 stores various kinds of data, programs, and the like.

The external I/F 103 is an interface with an external device. The external device includes a recording medium 103a, and the like. Thereby, it is possible for the service server 2 to read from and/or write to the recording medium 103a through the external I/F 103. The recording medium 103a includes a compact disk (CD), a digital versatile disk (DVD), an SD memory card, a Universal Serial Bus (USB) memory, and the like.

The ROM 105 is a nonvolatile semiconductor memory (storage device) capable of holding internal data even if the power source is turned off. The ROM 105 stores programs and data for network settings, and the like. The RAM 104 is a volatile semiconductor memory (storage device) for temporarily storing programs and data. The CPU 106 is an arithmetic unit that reads programs and data into the RAM 104 from the above-described storage devices (for example, the "HDD 108", the "ROM 105", and the like), and executes the processing so as to control the overall apparatus, and to achieve installed functions.

With the above-described hardware configuration, it is possible for the service server 2 according to the present embodiment to perform drawing processing and quality estimation processing in a remote desktop environment. For example, the CPU 106 executes the drawing processing and the quality estimation processing using data and programs stored in the ROM 105 and the HDD 108. As a result, in the present embodiment, it is possible to provide the user with an estimation result of a response time in the case of using network quality information in another environment based on the response time observed in the actually used environment. Thereby, it is possible for the user to determine whether practical use of the remote desktop environment in another environment (for example, the client device 5 at the second point in FIG. 1) is allowed or not in advance without performing actual measurement.

It is possible to store data on the operation log table 21, the response time table 22, the network quality information table 23, and the estimated response time table 24 in the RAM 104, the HDD 108, or a server in a cloud, which is connected to the service server 2 through a network, or the like.

In the above, a description has been given of a quality estimation program, a quality estimation method, and a quality estimation apparatus in the above-described embodiments. However, the quality estimation program, the quality estimation method, and the quality estimation apparatus according to the present disclosure is not limited to the above-described embodiments, and various variations and improvements are possible within the spirit and scope of the present disclosure. It is possible to combine the matters described in the above-described plurality of embodiments in the range that does not cause inconsistency. Each function of the above-described quality estimation apparatus may be configured by hardware, by software, or by a combination of hardware and software.

For example, the configuration of the remote desktop system 10 according to the above-described embodiments is one example, and does not limit the range of the present disclosure. It goes without saying that there are various examples of the system configuration in accordance with the applications and the purposes.

For example, a system configuration in which the client device 1 and the service server 2 are mutually connected through the network N1 is one mode of the remote desktop system 10 according to the present embodiment, and the present disclosure is not limited to this. For example, the number of units of the client device 1 and the service server 2 included in the remote desktop system 10 according to the present embodiment may be one unit or two units or more. In the case where a plurality of service servers 2 are installed, the drawing processing and the quality estimation processing may be performed by processing distributed among the plurality of service servers 2. The processing functions may be selectively consolidated into one server among the plurality of servers in accordance with the application and the purpose.

If the client device 1 is an electronic device having a communication function, it does not matter how many devices or what kind of the devices are provided. As an example of the client device 1, a personal computer (PC), a smart phone, a mobile phone, a personal digital assistant (PDA), a tablet device, an eyeglass-type or watch-type wearable device, a portable music device, a game machine, a projector, an office machine, home electric appliances, or the like may be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A quality estimation method executed by a processor included in a quality estimation apparatus, the method comprising:
   obtaining a plurality of packets communicated between a client device at a first point and a server device;
   extracting a number of losses indicating a number of lost packets among the plurality of packets by analyzing the plurality of packets;
   determining statistics information of a delay time due to packet loss of the plurality of packets, based on the number of losses and quality information indicating quality of a network used for communication between a client device at a second point and the server device; and
   estimating a response time of the server device on operation performed by the client device at the second point based on the determined statistics information,
   wherein the quality information includes a band, a packet loss rate indicating a probability of loss at communication time of each of the plurality of packets, the client device at the second point, and a round-trip time (RTT) corresponding to communication with the server device.

2. The quality estimation method according to claim 1, wherein the obtaining includes obtaining an operation command transmitted from the client device at the first point, and a plurality of drawing commands including image data transmitted from the server device against the operation command.

3. The quality estimation method according to claim 2, wherein the determining includes:
   assigning the number of losses to the operation command, a final drawing command indicating a last drawing command among the plurality of drawing commands, and one or more drawing commands excluding the final drawing command among the plurality of drawing commands, and
   obtaining a delay time due to packet loss of the operation command, a delay time due to packet loss of the final drawing command, and a delay time due to packet loss of the one or more drawing commands.

4. The quality estimation method according to claim 3, wherein the determining includes obtaining the delay time due to packet loss of the operation command and obtaining the delay time due to packet loss of the final drawing command, when the number of losses of the packets is two or more.

5. The quality estimation method according to claim 3, wherein the determining includes obtaining at least any one of a maximum value, a minimum value, and an average value of the delay time by packet loss based on a result of the obtaining.

6. The quality estimation method according to claim 1, wherein each of the plurality of packets is a packet communicated when the client device is using a remote desktop environment.

7. The quality estimation method according to claim 1,
wherein the estimating includes calculating a maximum value and a minimum value of the response time when the client device receives a service from the server device at the second point.

8. The quality estimation method according to claim 7, wherein the method further comprises
outputting a range of the calculated minimum value and maximum value, and an average value of the delay time.

9. The quality estimation method according to claim 1,
wherein the server device is coupled to the client device at the first point via a switch device, and is coupled to the client device at the second point via the switch device, and
wherein the obtaining includes obtaining the plurality of packets through the switch device.

10. A quality estimation apparatus comprising:
a memory; and
a processor coupled to the memory and configured to:
   obtain a plurality of packets communicated between a client device at a first point and a server device;
   extract a number of losses indicating a number of lost packets among the plurality of packets by analyzing the plurality of packets;
   determine statistics information of a delay time due to packet loss of the plurality of packets, based on the number of losses and quality information indicating quality of a network used for communication between a client device at a second point and the server device; and
   estimate a response time of the server device on operation performed by the client device at the second point based on the determined statistics information,
wherein the quality information includes a band, a packet loss rate indicating a probability of loss at communication time of each of the plurality of packets, the client device at the second point, and a round-trip time (RTT) corresponding to communication with the server device.

11. A non-transitory computer-readable recording medium that causes a quality estimation apparatus to execute a process, the process comprising:
   obtaining a plurality of packets communicated between a client device at a first point and a server device;
   extracting a number of losses indicating a number of lost packets among the plurality of packets by analyzing the plurality of packets;
   determining statistics information of a delay time due to packet loss of the plurality of packets, based on the number of losses and quality information indicating quality of a network used for communication between a client device at a second point and the server device; and
   estimating a response time of the server device on operation performed by the client device at the second point based on the determined statistics information,
wherein the quality information includes a band, a packet loss rate indicating a probability of loss at communication time of each of the plurality of packets, the client device at the second point, and a round-trip time (RTT) corresponding to communication with the server device.

12. A quality estimation method executed by a processor included in a quality estimation apparatus, the method comprising:
   obtaining a plurality of packets communicated between a client device at a first point and a server device;
   extracting a number of losses indicating a number of lost packets among the plurality of packets by analyzing the plurality of packets;
   determining statistics information of a delay time due to packet loss of the plurality of packets, based on the number of losses and quality information indicating quality of a network used for communication between a client device at a second point and the server device; and
   estimating a response time of the server device on operation performed by the client device at the second point based on the determined statistics information,
wherein the obtaining includes obtaining an operation command transmitted from the client device at the first point, and a plurality of drawing commands including image data transmitted from the server device against the operation command, and
wherein the determining includes:
   assigning the number of losses to the operation command, a final drawing command indicating a last drawing command among the plurality of drawing commands, and one or more drawing commands excluding the final drawing command among the plurality of drawing commands; and
   obtaining a delay time due to packet loss of the operation command, a delay time due to packet loss of the final drawing command, and a delay time due to packet loss of the one or more drawing commands.

13. The quality estimation method according to claim 12,
wherein the determining includes obtaining the delay time due to packet loss of the operation command and obtaining the delay time due to packet loss of the final drawing command, when the number of losses of the packets is two or more.

14. The quality estimation method according to claim 12,
wherein the determining includes obtaining at least any one of a maximum value, a minimum value, and an average value of the delay time by packet loss based on a result of the obtaining.

15. The quality estimation method according to claim 12,
wherein each of the plurality of packets is a packet communicated when the client device is using a remote desktop environment.

16. The quality estimation method according to claim 12,
wherein the quality information includes a band, a packet loss rate indicating a probability of loss at communication time of each of the plurality of packets, the client device at the second point, and a round-trip time (RTT) corresponding to communication with the server device.

17. The quality estimation method according to claim 12,
wherein the estimating includes calculating a maximum value and a minimum value of the response time when the client device receives a service from the server device at the second point.

18. The quality estimation method according to claim 17, wherein the method further comprises
outputting a range of the calculated minimum value and maximum value, and an average value of the delay time.

19. The quality estimation method according to claim 12,
wherein the server device is coupled to the client device at the first point via a switch device, and is coupled to the client device at the second point via the switch device, and
the obtaining includes obtaining the plurality of packets through the switch device.

* * * * *